United States Patent [19]
Aidun et al.

[11] Patent Number: 5,241,280
[45] Date of Patent: Aug. 31, 1993

[54] COATING THICKNESS MEASUREMENT GAUGE

[75] Inventors: Rashid K. Aidun, Potsdam; Frank J. Koch, Ogdensburg, both of N.Y.

[73] Assignee: DeFelsko Corporation, Ogdensburg, N.Y.

[21] Appl. No.: 533,444

[22] Filed: Jun. 1, 1990

[51] Int. Cl.[5] ............................................. G01R 27/00
[52] U.S. Cl. ..................................... 324/671; 324/690; 324/230
[58] Field of Search ............... 324/654, 655, 661, 671, 324/690, 229-231, 236, 237

[56] References Cited

U.S. PATENT DOCUMENTS

| | | | |
|---|---|---|---|
| 4,137,639 | 2/1979 | Zumbach | 324/231 X |
| 4,349,780 | 9/1982 | Zuber et al. | 324/229 X |
| 4,564,810 | 1/1986 | Geithman et al. | 324/230 |
| 4,567,436 | 1/1986 | Koch | 324/230 |
| 4,779,352 | 10/1988 | Lang | 324/229 X |
| 5,053,703 | 10/1991 | Fischer | 324/230 |

*Primary Examiner*—Kenneth A. Wieder
*Assistant Examiner*—Glenn W. Brown
*Attorney, Agent, or Firm*—Burns, Doane, Swecker & Mathis

[57] ABSTRACT

A coating thickness gauge includes a measurement transducer and a particularly advantageous probe arrangement. The probe arrangement includes a probe assembly and a probe housing that encircles the probe assembly. The probe assembly may include an inductor that forms a part of an LC oscillator. The gauge is able to measure the thickness of coatings on magnetic and non-magnetic substrates through use of the same probe assembly. Alternatively, the probe assembly can include a capacitor forming a part of an LC or an RC oscillator. The bottom surface of the probe housing has two oppositely positioned V-shaped grooves formed therein for facilitating the measurement of coating thicknesses on convex surfaces. The outer peripheral surface of the probe housing includes two spaced apart flat surfaces connected together by two arcuate surfaces for stabilizing the gauge during measurement of coating thicknesses on concave surfaces. The probe assembly is mounted within the gauge housing in a manner that is adapted to facilitate movement of the probe assembly in a substantially vertical plane. All functions of the gauge can be operated through the use of the two keys and the gauge only requires a zeroing adjustment rather than a several step calibration procedure.

14 Claims, 7 Drawing Sheets

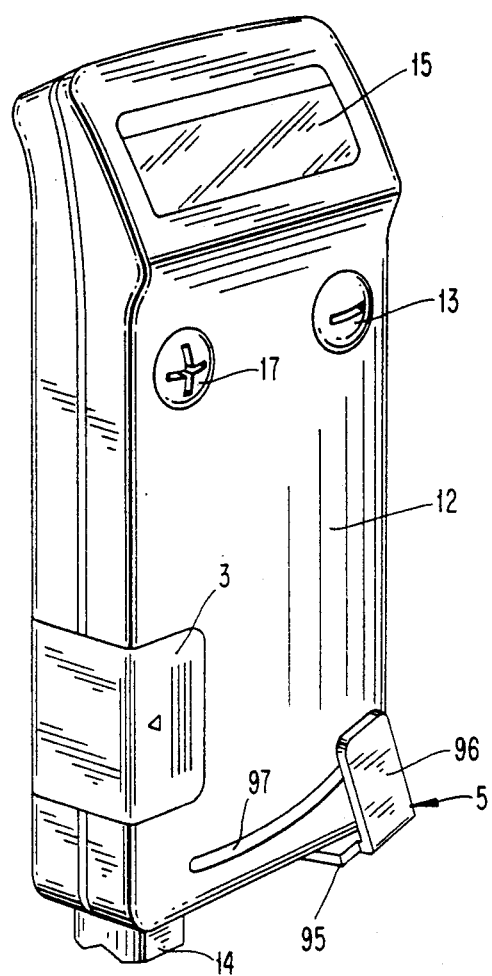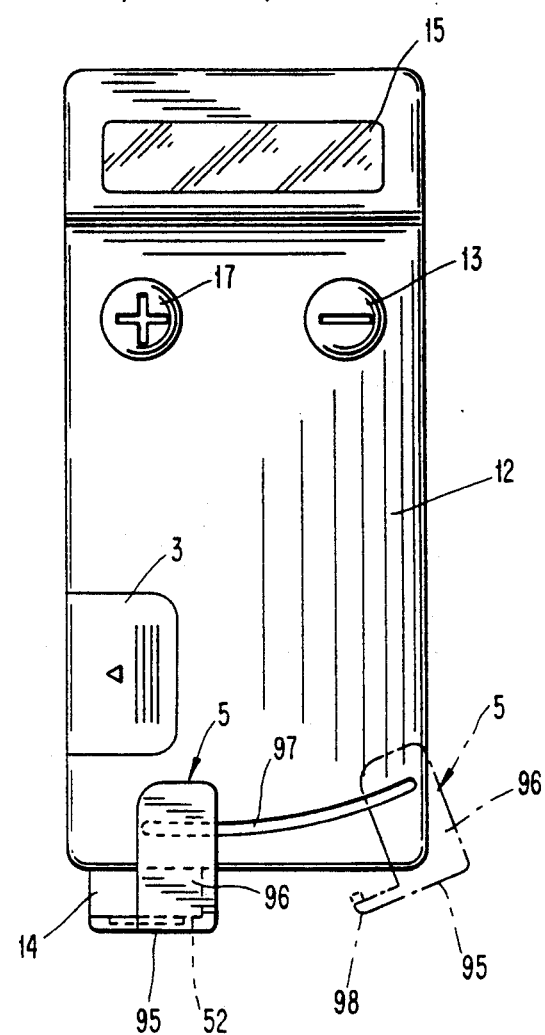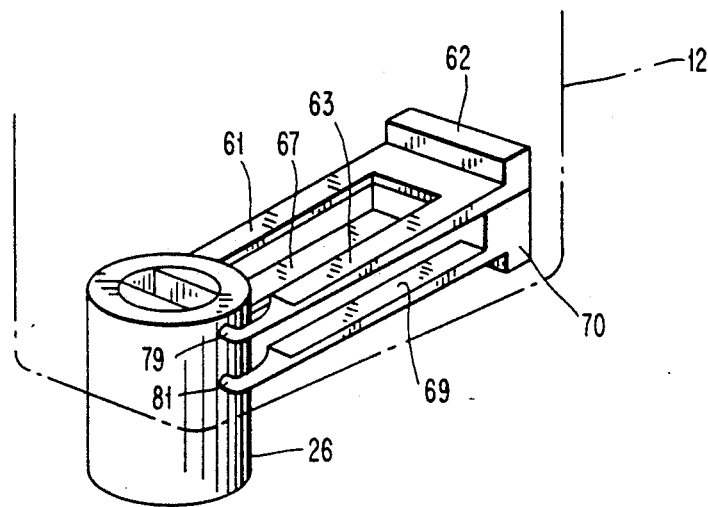

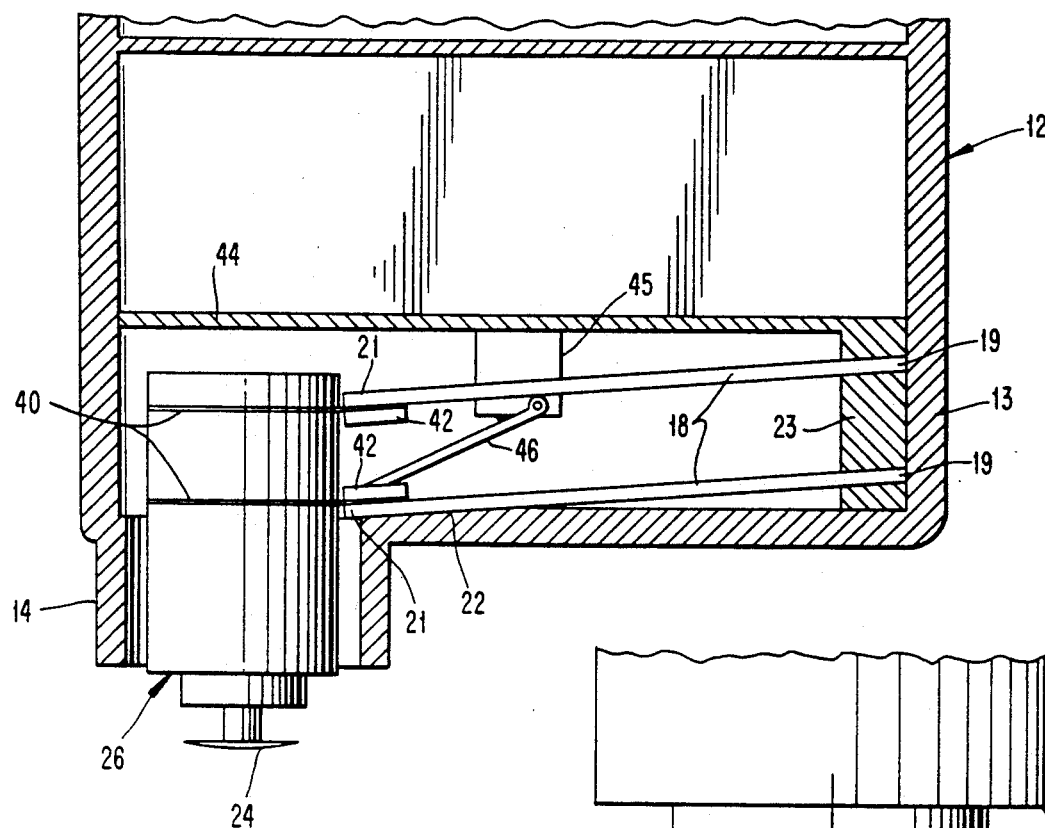
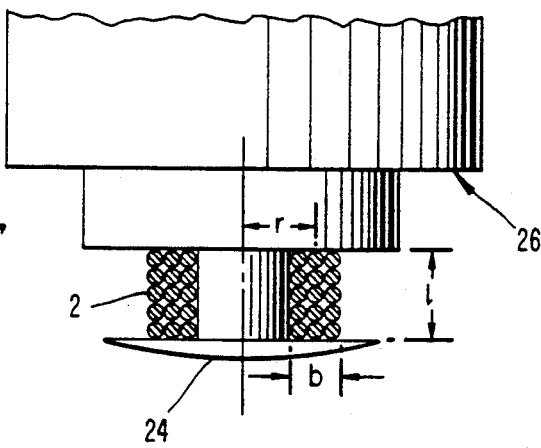
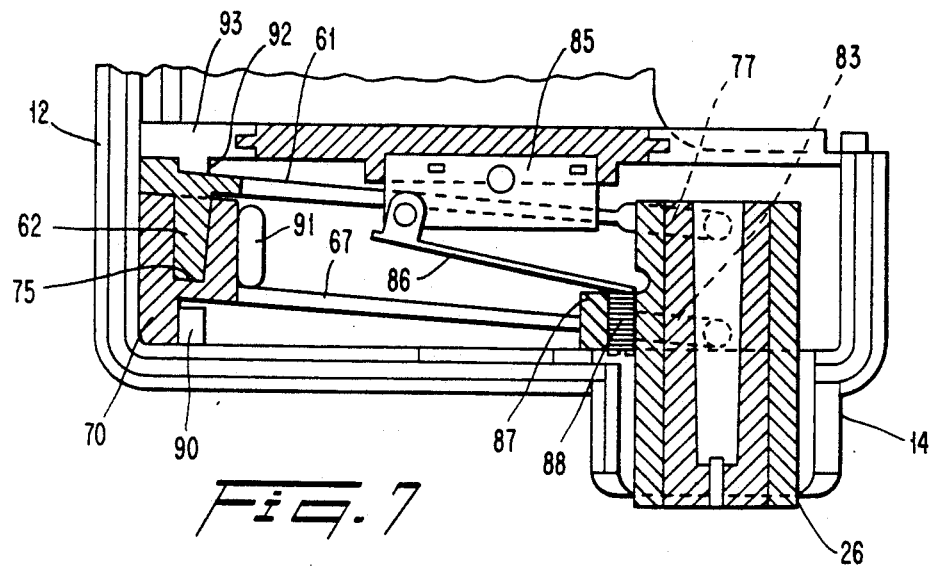

COATING THICKNESS MEASUREMENT GAUGE

BACKGROUND OF THE INVENTION

This application relates to a gauge for determining the thickness of a thin electrically non-conductive coating on an electrically conductive substrate and more particularly to a coating thickness measurement gauge based on the Eddy Current principal.

Numerous industrial applications require the non-destructive determination of the thickness of a thin electrically non-conductive coating on an electrically conductive substrate. Examples of such applications include anodizing, painting and enameling, powder coating, automobile manufacturing, boiler-making and other similar areas of manufacture in which protective layers are applied to articles. The ability to accurately determine the thickness of such protective or decorative layers allows the layers to be applied in sufficient thickness to perform well while avoiding waste accompanying excessive thickness.

One method of determining the thickness of such a coating is the known Eddy Current method according to which an AC-excited inductive coil is placed within a predetermined distance of the coating surface, the total distance between the coil and the electrically conductive substrate being the sum of the predetermined distance and the coating thickness. Since the impedance of the coil varies with its proximity to the electrically conductive substrate, the thickness of the coating may be determined by measuring the impedance of the coil.

One method of measuring the impedance of the coil is by measuring the phase delay that the inductor imparts to the current flowing through the coil relative to the voltage across the coil, the phase delay increasing with the impedance of the coil. Measuring the phase difference between the current and the voltage, however, is complicated and is susceptible to numerous sources of error. It would be desirable, therefore, to devise an alternative method of measuring the impedance of the coil in order to construct a small, portable thickness gauge of greater simplicity and accuracy.

Some conventional coating thickness measurement gauges are designed to permit the measurement of the coating thickness on convex surfaces such as the outer surfaces of pipes and the like. While those gauges can be used to measure the thickness of coatings on concave surfaces as well, the gauges are designed in such a way that when they are placed in contact with a concave coating surface, it is difficult to maintain the positioning and stability of the gauge relative to the concave coating surface. As a result, the accuracy and reproducibility of the measurements may be adversely affected. Consequently, it would also be desirable to develop a coating thickness measurement gauge capable of overcoming that problem.

Conventional coating thickness measurement gauges typically require a two point calibration procedure in order to calibrate the gauge. One calibration measurement is carried out on an uncoated substrate and a second calibration measurement is then performed on a standard substrate having a coating of known thickness. The two point calibration procedure and the construction of the gauge necessary for carrying out that two point calibration procedure suffers from certain disadvantages and drawbacks. For instance, the gauge must include suitable data entry buttons and the like for inputting the numerical data associated with the coating thickness on the standard substrate and of course, those additions increase the cost and complexity of the gauge. Moreover, as compared to a gauge that can be calibrated through one point calibration, more time is required to perform the two point calibration procedure. Thus, it would be desirable to provide a coating thickness measurement gauge that is simple in design, that is easy to use and that can be readily calibrated rather quickly.

In some instances, it may be desirable to determine the thickness of a coating which absorbs electromagnetic waves, such as, for example, a coating that contains particles of magnetic material. Depending upon the particular type of coating thickness measurement gauge that is employed, the ability of the coating to absorb electromagnetic waves may adversely affect the accuracy of the measured coating thickness. For example, when the coating thickness measurement gauge is based on the Eddy Current method, the impedance of the AC-excited inductive coil may be affected if the coating tends to absorb electromagnetic waves and thus, the resulting measurement obtained for the coating thickness may not accurately represent the true thickness of the coating. It would be desirable, therefore, to produce a coating thickness measurement gauge that is able to accurately measure the thickness of coatings that absorb electromagnetic waves, such as, for example, coatings that contain magnetic particles.

It would also be desirable to provide a coating thickness measurement gauge that is able to measure the thickness of a coating on magnetic and non-magnetic substrates through use of the same probe. Similarly, it would be very advantageous to provide a coating thickness measurement gauge that permits the user to select one of a plurality of magnetic and non-magnetic materials through operation of only two buttons, whereby the thickness of a coating on various types of substrates can be easily measured through use of the same gauge.

An object of the present invention, then, is to provide an improved coating thickness measurement gauge for measuring the thickness of thin electrically non-conductive coatings overlying electrically conductive substrates.

Another object of the present invention is to provide a coating thickness measurement gauge that is of simple construction and readily portable.

A further object of the present invention is to provide a coating thickness measurement gauge having a probe assembly of increased versatility.

An additional object of the present invention is to provide a coating thickness measurement gauge that is able to more easily measure the thickness of a coating by converting a measured frequency, which is already in a digital phase, to a digital indication.

Still another object of the present invention is to provide a coating thickness measurement gauge having a probe assembly of economical construction yet free from numerous disadvantages associated with the prior art.

A further object of the present invention is to provide a coating thickness measurement gauge that measures an oscillation frequency to arrive at a highly accurate thickness determination.

Still another object of the present invention is to provide a coating thickness measurement gauge of predominantly digital construction and increased reliability and ease of operation.

Yet still another object of the present invention is to provide a coating thickness measurement gauge that measures coatings overlying both ferromagnetic and non-ferromagnetic substrates using a single probe.

Another object of the present invention is to provide a coating thickness measurement gauge that needs only a single "zeroing" adjustment for a substrate material.

A still further object of the present invention is to provide a coating thickness measurement gauge that permits the selection of any one of a plurality of magnetic and non-magnetic materials through operation of only two buttons for allowing the coating thickness on magnetic and non-magnetic substrate materials to be easily measured.

Yet another object of the present invention is to provide a coating thickness measurement gauge that is able to accurately measure the thickness of coatings that, generally speaking, absorb electromagnetic waves, such as, for example, coatings that contain magnetic particles.

SUMMARY OF THE INVENTION

According to the present invention, the foregoing objects are realized by measuring the thickness of a thin electrically non-conductive coating on an electrically conductive substrate according to the Eddy Current method by incorporating an inductive coil into an LC oscillator having a frequency of oscillation which varies according to the impedance of the coil. The total distance between the coil and the electrically conductive substrate during measurement is the sum of a setoff and the coating thickness, and the impedance of the coil varies with proximity to the electrically conductive substrate. As a result of incorporating the coil into an oscillator, the impedance of the coil may be readily determined by the frequency of oscillation. This frequency and the corresponding thickness may be calculated by a digital microprocessor. The thickness may subsequently be displayed on a digital display resulting in a predominantly digital implementation with an associated increase in reliability.

Alternatively, the thickness of a coating on a metallic or non-metallic substrate can be measured by incorporating a capacitor into an RC or LC oscillator which has a frequency of oscillation that varies according to the voltage across the capacitor. The voltage across the capacitor will vary depending upon the proximity of the capacitor to the substrate. Thus, by measuring the change in frequency of the oscillator that results from the change in voltage across the capacitor as the capacitor is placed against the coating, the thickness of the coating can be ascertained.

A coating thickness measurement gauge for achieving at least the foregoing objects includes a measurement transducer and a particularly advantageous probe arrangement. More specifically, the probe arrangement includes a probe assembly positioned in a probe housing. The bottom surface of the probe housing is provided with a V-shaped groove for facilitating the measurement of a coating thickness on a convex surface. The outer peripheral surface of the probe housing includes two substantially flat surfaces spaced apart by two arcuate surfaces. The flat surfaces and the bottom surface of the probe housing intersect to define straight edges. When the bottom surface of the probe housing is placed against a concave surface, the probe housing contacts the concave surface along two spaced apart lines defined by the straight edges. As a result, the position of the gauge is stabilized during the measurement of a coating thickness on a concave surface. In one embodiment, the probe assembly including at least a portion of the measurement transducer, is mounted with respect to the probe housing by two parallel suspension levers that are inclined with respect to a horizontal plane. The suspension levers can be connected to the probe assembly by flexible hinges. In another embodiment, the probe assembly is mounted with respect to the probe housing by two parallel suspension levers, each of which includes a pair of arms that are connected to opposite sides of the probe assembly.

BRIEF DESCRIPTION OF THE DRAWING

FIG. 1 is a perspective view of a hand-held coating thickness measurement gauge constructed according to the present invention;

FIG. 2 is a front view of the hand-held coating thickness gauge illustrated in FIG. 1;

FIG. 5 is a partial cross-sectional view showing a probe assembly mounted in the probe housing according to one embodiment of the present invention;

FIG. 6 is an enlarged view of a portion of the probe assembly;

FIG. 7 is a cross-sectional view showing the probe assembly mounted in the probe housing according to another embodiment of the present invention;

FIG. 8 is a top perspective view showing the probe assembly of FIG. 7 mounted in the probe housing;

DETAILED DESCRIPTION OF THE PREFERRED EMBODIMENT

Figure 3:
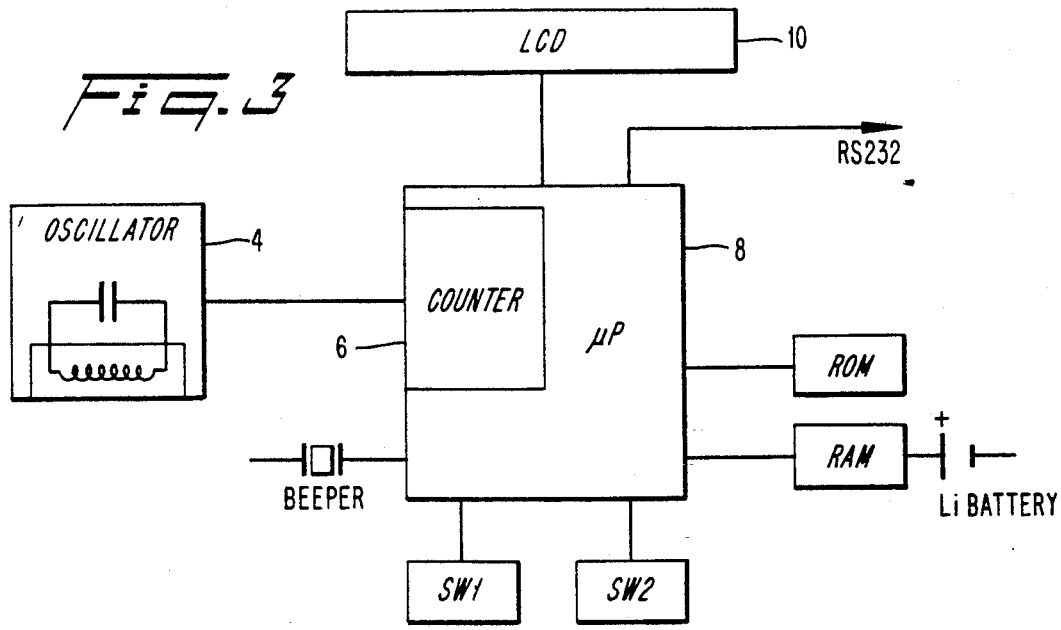
FIG. 3 is a block diagram of the coating thickness measurement gauge according to one embodiment of the present invention.

Referring first to FIG. 1, a coating thickness measurement gauge according to the present invention preferably is configured to be comfortably held in the hand of an operator and has as its principle parts a gauge housing 12, a probe housing 14, a display window 15, and two selector buttons 13 and 17. Although not shown, a measurement activating button is also provided in the probe housing. The coating thickness measurement gauge is battery powered and thus self-contained. A removable cover 3 is positioned on one side of the housing 12 for covering a compartment which may contain the battery. The gauge may be further provided with a clip-on carrying case allowing the gauge to be conveniently carried on a person's belt, pocket or the like.

The probe assembly (not shown in FIG. 1) which is housed within the probe housing 14 is relatively delicate and sensitive. Thus, when the gauge is not being used, it is desirable that the probe assembly be protected from accidental damage and actuation of the measurement button that may result from improper handling. That protection can be afforded to the gauge by providing the gauge with a generally U-shaped protective cover 5. The protective cover 5 includes a bottom portion 95 and two wings 96 (only one of which is shown in FIG. 1) that are connected to and extend away from the bottom portion 95. The inner surface of each wing 96 has an inwardly extending projection (not shown) that engages a respective guide slot 97 formed on each side of the gauge housing 12. The projections extending inwardly from the inner surfaces of the wings 96 frictionally engage the respective guide slot 97 and thereby maintain the protective cover 5 in a set position when the protective cover 5 is not being manually moved.

As seen in FIG. 2, the protective cover 5 can be moved as far left as possible such that the bottom portion 95 underlies the probe housing 14 and the probe assembly (not shown in FIG. 2) located within the probe housing 14. In that position, the cover 5 serves the function of protecting the probe assembly 26 from accidental damage.

On the other hand, when the gauge is to be used for measuring the thickness of a coating on a substrate, the protective cover 5 can be moved as far right as possible, as also shown in FIG. 2. The protective cover 5 and the guide slot 97 are designed such that when the protective cover 5 is in the rightmost position as illustrated in FIG. 2, the lowermost tip 98 of the protective cover 5 is in substantially the same horizontal plane as the bottom surface 52 of the probe housing 14. Thus, the protective cover 5 serves the additional function of acting as a supporting leg for steadying the gauge during measurement of a coating thickness and for maintaining the probe assembly in a perpendicular orientation with respect to a straight surface on which is located the coating whose thickness is being measured.

The protective coating 5 is preferably fabricated from injection molded plastics material although other materials may be employed.

It may be seen from FIGS. 1 and 2 that the coating thickness measurement gauge of the present invention is of simple construction allowing the gauge to be made small and easily portable. The simplicity of the construction also results in reduced costs. At the same time, the predominantly digital implementation of the gauge enables a high degree of accuracy and reliability to be achieved.

As seen in FIG. 3, the coating thickness measurement gauge is based on a microprocessor unit 8 with an associated display 10 which is displayed through the display window 15 (see FIG. 1) and further includes an LC oscillator 4. The probe of the coating thickness measurement gauge is the inductor of the LC oscillator 4 which may be of a suitable known type. According to a preferred embodiment, the inductor may be a simple air-core solenoid-type coil. The phrase "air-core" is meant to refer to a coil having a core made of non-magnetic, non-metallic material. In practice, the wire is wound around a non-magnetic, nonmetallic rod. During measurement, a probe structure housing the probe is placed in contact with the surface of the coating such that the separation of the coil and the electrically conductive substrate is a function of the geometry of the probe structure and the coating thickness.

As previously noted, the impedance of the coil varies with its proximity to the electrically conductive substrate resulting in a corresponding variation in the oscillation frequency of the LC oscillator 4. This frequency is determined by the counter 6 which is a part of the microprocessor unit 8. For instance, a timing loop may be programmed into the computer unit 8 such that the microprocessor unit 8 resets the counter 6 at the beginning of the timing loop and measures the period of time elapsed until a predetermined number of pulses has occurred as indicated by an overflow signal. The pulses may be prescaled or divided down such that a counter of reasonable capacity may be used. The number of measured oscillations should be large enough however to achieve the desired accuracy.

Figure 4:
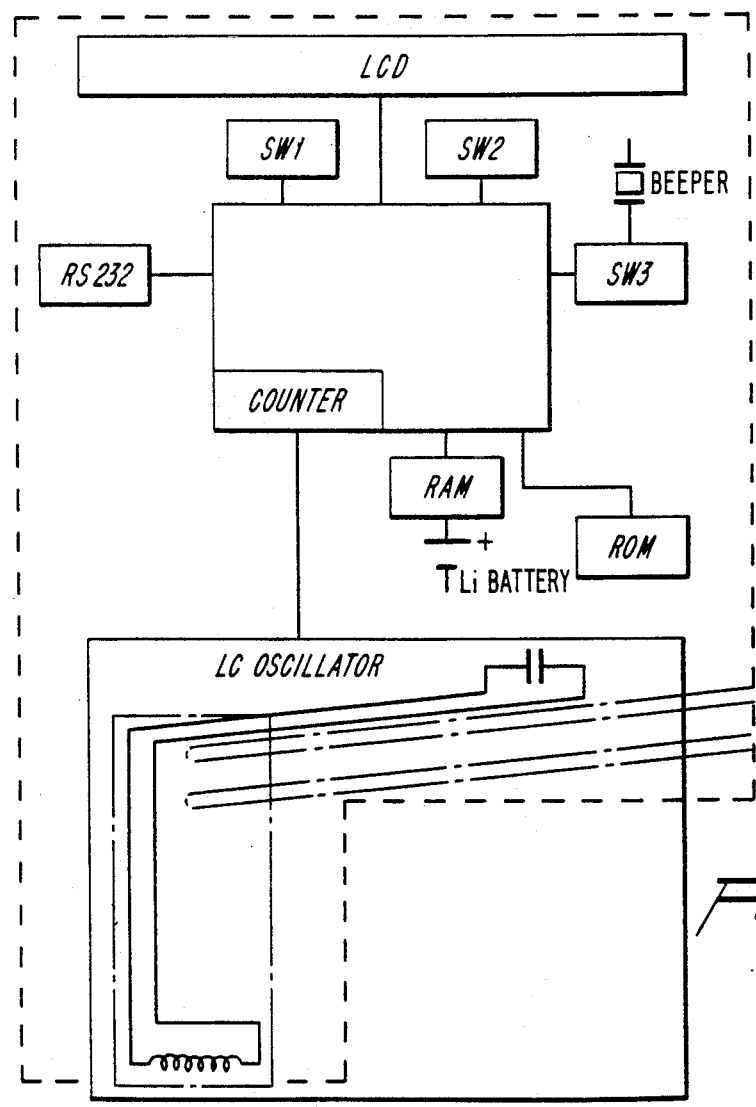
FIG. 4 is a block diagram showing how the component circuitry of FIG. 3 is disposed within a housing in relation to the probe assembly.

The gauge includes a beeper as depicted in FIG. 4 which functions during operation of the gauge in a manner that will become apparent from the description below. A switch SW3 is associated with the beeper for varying the loudness or the volume of the beeper.

In order to achieve the desired accuracy for the coating thickness measurements, the measuring position of the probe relative to the coating surface should be precisely reproducible on each measurement. The need for reproducibility in the probe position has been addressed by providing the probe with a constant pressure tip that maintains a constant pressure, and a corresponding constant positional relationship, between the probe tip and the coating surface. In the past, probe assemblies (in cooperation with the instrument's housing) have suffered from two significant disadvantages, the first being wire breakage and the second being problems relating to accurate positioning of the probe. Wire breakage occurs when the wires that connect the probe coil to the rest of the system break due to repeated flexing movement of the probe tip. With respect to accurate probe positioning, a common mechanism for maintaining a precise relation between the probe and the coating surface has been the use of a particularly configured bearing surface. A problem arises, however, in that such bearing surfaces are damaged by dirt, dust, and chemical liquids and vapors common to typical manufacturing environments where coating thickness measurement gauges are employed.

Referring to FIG. 5, the probe assembly of the present invention is designed to avoid the problems of wire breakage and accurate probe positioning. Constant tip pressure, vertical positioning of the probe with respect to the coating surface, and movement of the probe assembly in a vertical plane are achieved by mounting the probe assembly 26 on two substantially parallel suspension levers 18 which are in turn mounted within the housing 12. Preferably, the one end 19 of each supporting lever 18 is fixedly mounted in any suitable manner to a mounting block 23 which is itself, fixedly secured to the wall 13 of the housing 12. The suspension levers 18 are preferably mounted within the housing 12 in an inclined manner so that the longitudinal axis of each lever 18 forms an angle of approximately 4° with the dead center position (i.e., a horizontal plane perpendicular to the longitudinal plane of the gauge) when no upward force is applied to the probe tip 24.

The other end 21 of each of the suspension levers 18 is preferably connected to flexible hinges 40. The hinges 40 are preferably composed of a thin polypropylene film having a thickness of approximately five mils. The hinges 40 are sandwiched between the end 21 of each of the suspension levers 18 and mounting blocks 42 affixed to the suspension levers 18. At the other end, the hinges 40 are secured to the probe assembly 26 by being sandwiched between layers of the probe assembly 26.

A switch mechanism 45 is positioned within the housing 12 and may be secured to a support wall 44 which is located in the housing 12 and which is formed as an integral part of the mounting block 23. The switch mechanism 45 can have an actuator 46 that extends therefrom and that contacts the upper surface of the mounting block 42 associated with the lower suspension lever 18. During operation, when the probe assembly 26 moves upwardly, the actuator 46 is also moved upwardly to close a circuit and thereby activate the sensing circuitry. Alternatively, the actuator 46 can be configured to rest against some part of the upper suspension lever 18 or another portion of the lower suspension lever 18.

The suspension levers 18 are mounted with respect to the probe assembly 26 such that the longitudinal axis of the probe assembly 26 is substantially parallel to the longitudinal axis of the probe housing 14. Thus, the longitudinal axis of each suspension lever 18 preferably forms an angle of approximately 94° with the longitudinal axis of the probe assembly 26 when the suspension levers 18 are inclined 4° from the dead center position as shown in FIG. 5.

The suspension levers 18 are mounted in an inclined manner and are fixedly mounted at one end to help ensure that the probe assembly 26 moves up and down in a substantially vertical direction when the probe tip 24 is pressed against a coated surface. Also, that arrangement helps ensure that the probe assembly 26 is substantially vertically positioned when the gauge is activated for measuring the thickness of a coating. Substantially vertical movement and substantially vertical positioning of the probe assembly 26 are desirable in order to obtain accurate measurements. Once the probe 26 begins to move away from the vertical direction, different portions of the probe tip 24 contact the coated surface, thereby affecting the accuracy of the measurements.

It can be readily appreciated that a probe assembly mounted on suspension levers which are secured to the housing in any suitable manner will tend to move in an arcuate path when an upward force is applied to the probe assembly. That arcuate path of movement will cause the probe assembly to move laterally out of the vertical plane in which the probe assembly is initially positioned, thereby preventing the probe assembly from following a vertical path of movement. The movement of the probe assembly in the lateral direction can cause the sensing rod located in the tip of the probe assembly to be scuffed as it moves across the coated substrate, thereby resulting in undesirable wear to the sensing probe as well as unwanted marring of the coated substrate.

The tendency of the probe assembly to change its position in the lateral direction is due, at least in part, to the fact that the probe assembly traverses an arcuate path of movement when a force is applied thereto. The inventors herein have found that lateral movement of the probe assembly can be substantially prevented by fixedly mounting the suspension levers 18 at the one end 19 and by inclining the suspension levers downwardly at an angle of approximately 4° from the dead center or horizontal position. As a result of that arrangement, when a force is applied to the probe tip 24 that forces the probe assembly 26 to move upwardly, the fixed mounting of the suspension lever 18 will cause the levers 18 to bend slightly, thereby reducing their effective length. The shortening of the effective length of the lever 18 causes the probe assembly 26 to move slightly horizontally inwardly from the vertical plane in which the probe assembly 26 is originally positioned. However, since the normal upward path of movement of the lever 18 from its initial 4° inclined position causes the probe assembly 26 to move slightly horizontally outwardly from the vertical plane in which the probe assembly 26 is originally positioned (due to the arcuate path of movement traversed by the probe assembly), those inward and outward movements tend to cancel one another out and thus, the probe assembly 26 moves in a substantially vertical plane.

The flexible hinges 40 permit the probe assembly 26 to pivot slightly relative to the suspension levers 18 when the probe assembly 26 moves upwardly, thereby helping to ensure that the probe assembly 26 moves in a vertical plane.

Preferably, the lowermost suspension lever 18 rests against a flat surface 22 at the bottom of the housing 12. The surface 22 may be inclined at substantially the same angle as the angle at which the suspension levers 18 are inclined (i.e., approximately 4° in the preferred embodiment) in order to provide a stable surface upon which the lowermost lever 18 can rest.

Figure 9:
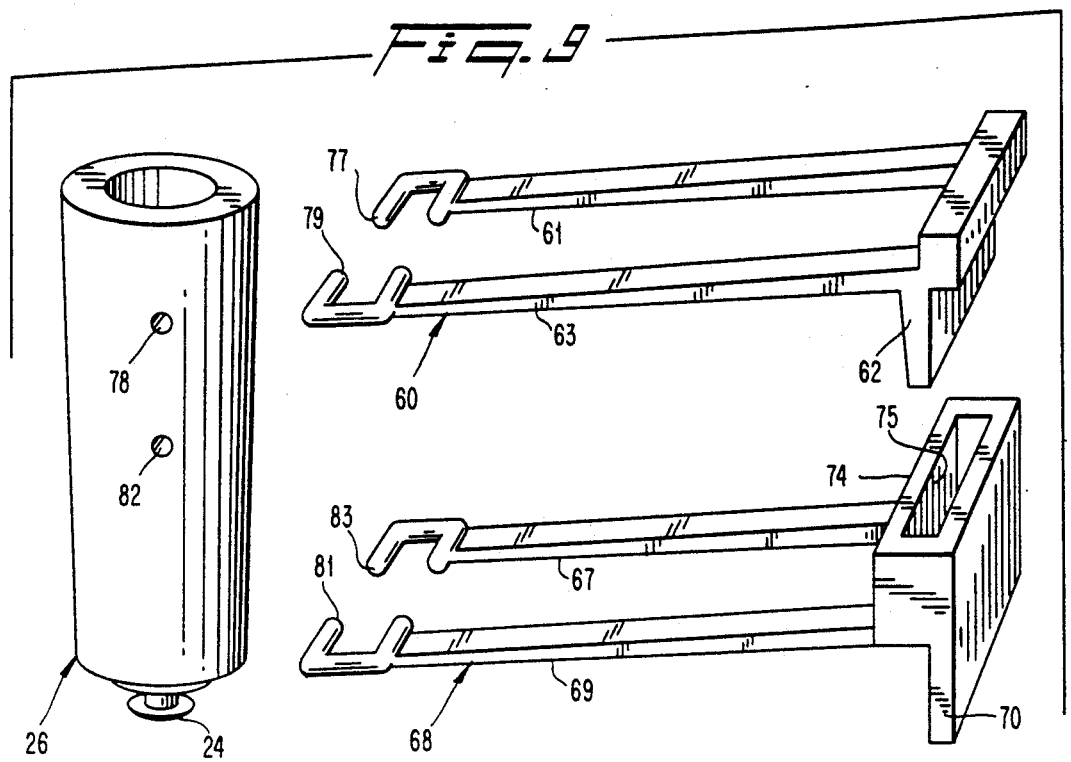
FIG. 9 is an exploded view of some of the features of the probe assembly illustrated in FIG. 7.

A second embodiment of the manner in which the probe assembly 26 can be mounted within the housing 12 is shown in FIGS. 7-9. Referring first to FIG. 9, two suspension levers 60, 68 are provided for mounting the probe assembly 26 within the housing. The suspension levers 60, 68 are connected to the probe assembly 26 in a manner that will become apparent from the following description.

The upper suspension lever 60 includes two parallel arms 61, 63 which, at one end, are preferably integrally formed in one piece with a mounting plate 62. A pintle 77, 79 is connected to and preferably integrally formed in one piece with the opposite end of each of the arms 61, 63. Similarly, the lower suspension lever 68 includes two parallel arms 67, 69. One end of each arm 67, 69 is integrally formed in one piece with a mounting plate 70 having an enlarged upper portion 74 which has a slot 75 located therein for receiving the lower end of the upper mounting bracket 62. The opposite end of each arm 67, 69 is also connected and preferably integrally formed in one piece with a pintle 83, 81, respectively.

The pintles 77, 79 associated with the arms 61, 63 of the upper suspension lever 60 fit into blind bores or gudgeons 78 formed in the probe assembly 26. Only one of the gudgeons 78 is shown in FIG. 9 but it is to be understood that another gudgeon is positioned diametrically opposite to the gudgeon 78 shown in FIG. 9. In a similar manner, the pintles 81, 83 associated with the arms 69, 67 of the lower suspension lever 68 fit into gudgeons or blind holes 82 formed in the probe assembly 26. Although FIG. 9 illustrates only one of the gudgeons 82, it is to be noted that another gudgeon is positioned diametrically opposite to the gudgeon 82 shown in FIG. 9. The upper gudgeons 78 are positioned axially above the lower gudgeons 82. Preferably, the four gudgeons 78, 82 are substantially aligned in a plane that contains the longitudinal axis of the probe assembly 26. Each of the pintles 77, 79, 81, 83 is freely rotatable within their respective gudgeon 78, 82 so that the probe assembly 26 can move relative to the upper and lower suspension levers 60, 68.

FIG. 8 illustrates the manner in which the probe assembly 26 is mounted within the housing 12 with respect to the upper and lower suspension levers 60, 68.

Turning to FIG. 7, the interior of the housing 12 is specifically adapted and configured to receive and secure in place the suspension levers 60, 68. In particular, the interior of the housing 12 includes two confining blocks 90, 91 that cooperate in conjunction with a flange 92 extending downwardly from a cover 93 which encloses an area within the housing 12. The confining blocks 90, 91 and the downwardly extending flange 92 serve to maintain the position of the upper mounting plate 62 relative to the lower mounting plate 70 and thereby restrain substantially all movement of the mounting blocks 62, 70 in the vertical direction. Likewise, the confining blocks 90, 91 and the downwardly extending flange 92 press the upper and lower mounting plates 62, 70 against the wall of the housing 12 and thereby prevent movement of the mounting blocks 62, 70 in the horizontal direction. As a result of the above-described mounting structure, the upper and lower supporting levers 60, 68 operate as though they are fixedly mounted. That is to say, when a force is applied to the probe assembly 26, the supporting levers 60, 68 react in substantially the same manner as they would if they were fixedly secured to the inner wall of the housing 12.

The downwardly extending flange 92 may be attached to a removable cover 95 for permitting access to the suspension levers 60, 68 and the probe assembly 26. The cover 95 may be divided into a plurality of removable sections if desired.

A switch mechanism 85 in the form of an electrical switch is secured to the cover 93 or one of the plurality of separate cover portions. An actuator 86 forms a part of the switch mechanism 85. The actuator 86 preferably rests on the surface of a projection 87 that extends outwardly from the peripheral surface of the probe assembly 26. The actuator 86 moves upwardly in response to upward movement of the probe assembly 26 to cause the closing of a circuit and activation of a sensing circuitry. It is to be understood that the actuator 86 could be positioned in a manner different from that described above and shown in FIG. 7, so long as the actuator responds to movement of the probe assembly 26 and thereby activates the sensing circuit.

The actuation point of the switch mechanism 85 can be adjusted by providing an adjustable screw 88 located in the outwardly extending projection 87. The actuator 86 contacts the screw 88 so that rotation of the screw 88 causes vertical movement of the actuator 86. Thus, by moving the screw 88 upwardly as seen in FIG. 7, the actuator 86 can be moved closer to the actuation point of the switch mechanism 85 which means that less movement of the probe assembly 26 will be necessary to activate the switch mechanism 85. Conversely, rotating the screw 88 so that it moves downwardly as seen in FIG. 7 will cause the actuator 86 to move farther from the actuation point of the switch mechanism 85 whereby the probe assembly 26 will have to be moved a greater distance before actuating the switch mechanism 85.

As can be seen from FIG. 7, the pair of arms 61, 63 and 67, 69 defining each suspension lever 60, 68 are connected to their respective mounting brackets 62, 70 so that when the mounting brackets 62, 70 are mounted in the housing 12 in the vertically oriented position, the arms 61, 63, 67, 69, are inclined downwardly 4° with respect to a horizontal or dead center position.

As a result of the fixed positioning and inclined nature of the arms 61, 63, 67, 69 defining the suspension levers 60, 68, the probe assembly 26 illustrated in FIGS. 7-9 is able to move in a substantially vertical plane of movement when the tip 24 of the probe assembly is pressed against the surface of an object whose coating thickness is to be measured. The probe assembly 26 is able to move in a vertical plane of movement for the same reasons described above with respect to the FIG. 5 embodiment. That is, during upward movement of the probe assembly 26, the outward lateral movement of the probe assembly 26 from the plane in which it is initially positioned is compensated for and substantially cancelled out by the inward lateral movement of the probe assembly resulting from the bending of the arms 61, 63, 67, 69 caused by the substantially fixed mounting of the arms 61, 63, 67, 69.

In the position illustrated in FIG. 7, the probe assembly 26 is in the resting position as a result of the fact that the probe assembly is not being pressed against a surface. When the probe assembly 26 is not being pressed against a surface for measuring a coating thickness, the probe assembly 26 will preferably be positioned in the probe housing 74 such that the actuator 86 is in contact with the top surface of the projection 87 extending from the probe assembly 26. When the probe assembly 26 is then pressed against a surface, the upward movement of the probe assembly 26 will cause the actuator 86 to also move upwardly and will result in activation of the switch mechanism 85 which controls the operation of the gauge.

For purposes of simplicity and clarity, the embodiments illustrated in FIG. 5 and FIGS. 7-9 have been illustrated without the protective cover 5 shown in FIGS. 1 and 2 which is connected to the housing 12 for covering the probe housing 14 and the probe assembly 26. It is to be understood, however, that the protective cover 5 is preferably provided on both embodiments of the gauge.

In order to avoid the previously mentioned problems associated with wire breakage, a pair of wires extending from the coil 2 shown in FIG. 6 have an extension portion that is glued or otherwise attached in any suitable manner to the top surface of one of the suspension levers. As a result, the wires move with the suspension levers, thereby minimizing the effect of repeated flexing on the wires. It is to be understood that the attachment of the wire to the suspension lever can be advantageously used in conjunction with all of the embodiments of the present invention.

The relationship of the change in frequency of the oscillator 4 to the coating thickness is dependent on the particulars of the geometry of the probe assembly 26, shown in expanded detail in FIG. 6. The features of the probe assembly 26 shown in FIG. 6 are indicative of the features of the probe assembly 26 for both embodiments illustrated in FIG. 5 and FIGS. 7-9. The most significant parameters affecting the relationship of the change in frequency to the coating thickness are the diameter r of the coil 2, the number of turns of the coil 2, the height 1 of the coil, the gauge of the wire as it affects the dimension b, and the material of the wound wire. Furthermore, the relationship is different depending on the material composition of the substrate. For a magnetic substrate such as soft steel, the relationship may be approximated by the fourth-order polynomial:

$$Y = A_0 + A_1 F + A_2 F^2 + A_3 F^3 + A_4 F^4$$

where the coefficients $A_{0-4}$ are determined by the geometry of the probe and the magnetic and electrical characteristics of the substrate. Similarly, for a non-magnetic substrate such as aluminum, the relationship may be approximated by the fourth-order polynomial:

$$Y = B_0 + B_1 F + B_2 F^2 + B_3 F^3 + B_4 F^4$$

where the electrical characteristics of the substrate results in a different set of coefficients $B_{0-4}$. The basic form of the equation, however, remains the same.

For a six-turn single layer wound coil using 26-gauge copper wire, the coefficients $A_{0-4}$ may be empirically determined and represented as follows for the soft steel substrates, with F representing the frequency change in KHZ and Y representing the thickness in microns:

$$Y = 7346.26 - (11.5520)F + (7.74659 \times 10^{-3})F^2 - (2.49226 \times 10^{-6})F^3 + (3.07629 \times 10^{-10})F^4.$$

For the non-magnetic aluminum substrates, the following coefficients $B_{0-4}$ are substituted:

$$Y = 10090.44 - (26.965)F + (3.0195 \times 10^{-2})F^2 - (1.60374 \times 10^{-5})F^3 + (+3.25473 \times 10^{-9})F^4.$$

Figure 10:
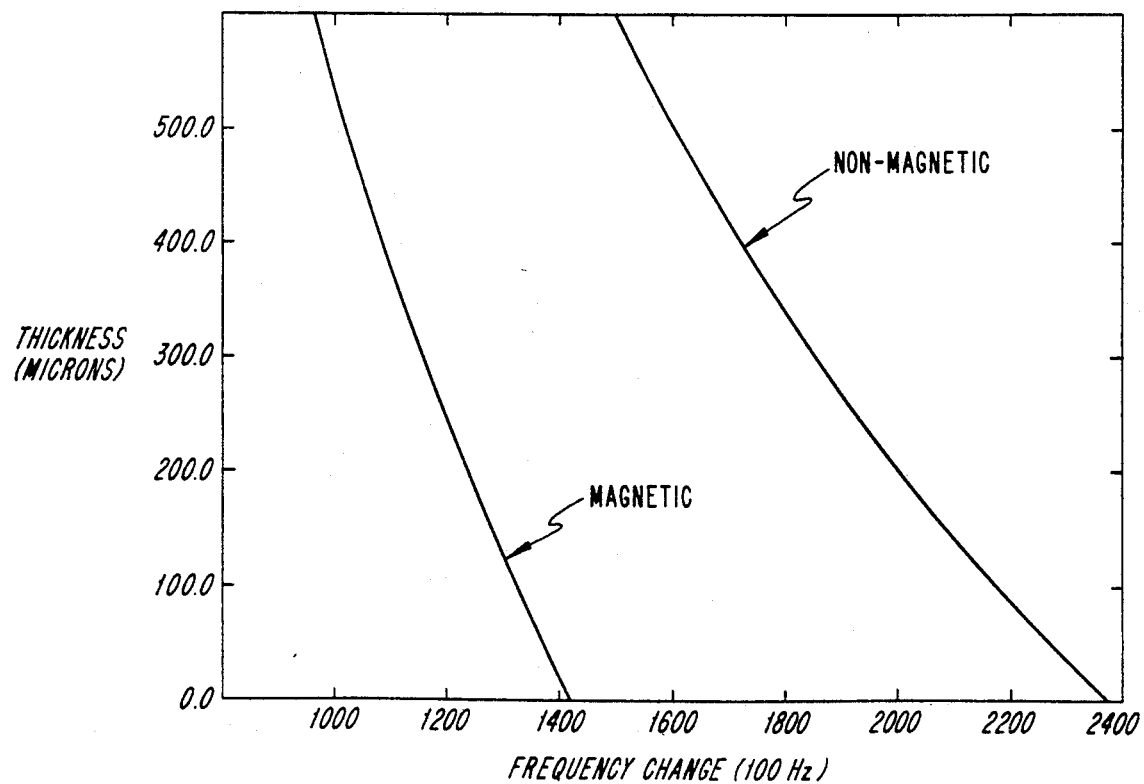
FIG. 10 is a graph of thickness versus frequency change for magnetic and non-magnetic substrates for a specific probe.

The curves resulting from the two foregoing exemplary equations are plotted in FIG. 10. A complete set of coefficients, $A_{0-4}$ or $B_{0-4}$, are stored in a ROM portion of the microprocessor unit 8 (see FIG. 4) during production of the thickness gauge for each desired substrate material. Alternatively, if it is found that a group of substrate materials possesses substantially the same set of coefficients $A_{0-4}$ or $B_{0-4}$, the coefficients associated with each group of substrate materials may be stored in the ROM portion of the microprocessor unit 8. Thus, upon selection of one of the substrate materials or one of the groups of substrate materials stored in the memory, the coefficients $A_{0-4}$ or $B_{0-4}$ associated with the selected substrate material or selected group of substrate materials can be recalled from the ROM and employed along with the measured frequency change in the appropriate equation shown above for determining the coating thickness.

Figure 11:
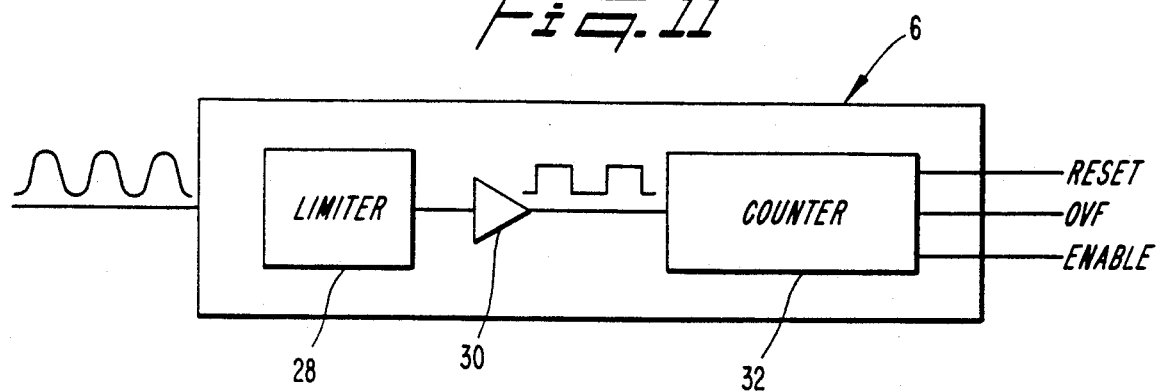
FIG. 11 is a block diagram of the counter shown in FIGS. 3 and 4.

Changes in oscillation frequency upon which thickness calculations are based occur in the analog domain whereas the calculations themselves are performed in the digital domain. Conversion from the analog domain to the digital domain is carried out in a straight-forward manner as seen with reference to FIG. 11 which shows the counter 6 in greater detail.

At the counter 6, the sinusoidal frequency output signal of the oscillator 4 is limited to a manageable amplitude by a limiter 28 and shaped by a Schmitt trigger 30 to yield a square wave of the same frequency. The square wave is in turn fed to the counting input of a counter 32. The counter 6 is further provided with reset and enable inputs controlled by the microprocessor, the counter 32 being reset previous to each measurement and enabled for counting a predetermined number of prescaled pulses.

The counter 6 is preferably incorporated together with or attached as an accessory to the microprocessor as shown in the preferred embodiment of FIG. 3. In alternative embodiments, the counter may also be realized entirely in software by having the microprocessor sample the frequency output of the wave shaper. The microprocessor is a single chip unit placed inside the instrument.

Using the oscillation frequency obtained from the counter 6, the microprocessor unit 8 calculates the coating thickness using the foregoing equations in which F is partly determined by a zeroing adjustment or calibration procedure. This calibration procedure or zeroing adjustment is performed to compensate for surface profile and temperature and consists of determining the oscillation frequency (i.e., the reference frequency) when the probe tip 24 is in contact with a bare portion of the electrically conductive substrate surface on which is disposed the coating. Alternatively, when the substrate is completely covered by the coating so that there is no bare portions, the reference frequency can be determined by placing the probe tip 24 in contact with the bare surface of a material that is the same as the substrate material. This calibration or reference frequency is then stored away in the random access memory (see FIG. 4) of the instrument which is powered by a lithium battery (nonvolatile memory). Thus, calibrating the coating thickness measurement gauge of the present invention only requires a one point calibration procedure.

It can be seen from the foregoing description that the gauge of the present invention is ready for measuring the thickness of a coating after the simple zeroing adjustment. Thus, the gauge of the present invention possesses significant advantages over conventional coating thickness measurement gauges which require a two point calibration procedure in order to calibrate the gauge. The two point calibration procedure usually requires the gauge to be calibrated by zeroing the gauge on a bare substrate and then inputting the known thickness of coating on a standard substrate into the gauge prior to or after measuring the thickness of the coating on the standard substrate. The simple zeroing adjustment procedure that is possible through use of the gauge of the present invention requires less time than the two point calibration procedure and is, of course, more easily performed than the two point calibration procedure because there is no need to input data and/or other information into the gauge concerning the coating on the standard substrate. Additionally, since the gauge of the present invention does not require two point calibration, it is not necessary that the gauge be fabricated with data input buttons and other hardware and associated circuitry for inputting data and/or other information relating to the coating on the standard substrate. Accordingly, the coating thickness measurement gauge can be made much more simple and of course, less expensive.

The microprocessor unit 8 is programmed with routines for calculating the thickness of coatings overlying both ferromagnetic and non-ferromagnetic substrates, the particular routine being invoked for a given measurement being selected by the user by means of any suitable input device such as the selector switch 17 of FIG. 1. Once the counter 6 has been reset and the type of substrate has been selected, the microprocessor enables the counter for a known period of time during which a frequency count is accumulated. By dividing the predetermined pulse count by the time elapse, the frequency is determined and subsequently compared with the calibration or reference frequency to determine a change in frequency F. The thickness is then calculated according to the appropriate equation. The results of the calculation may be conveniently displayed through an output port onto a digital display 10. The same results may likewise be output through a separate output port to a data collection or other peripheral device.

Figure 12:
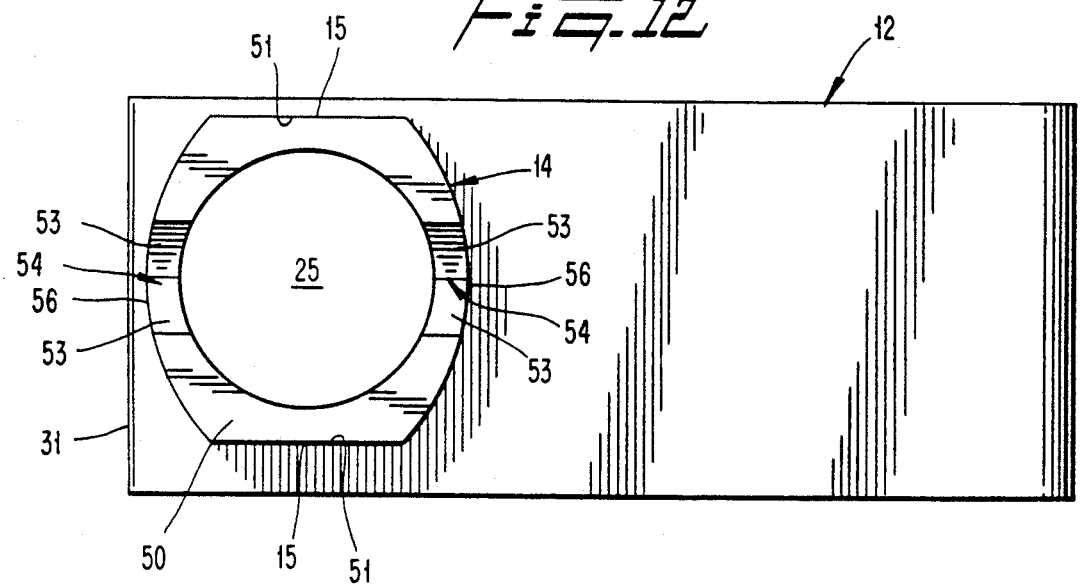
FIG. 12 is a bottom view of the probe housing.
Figure 13:
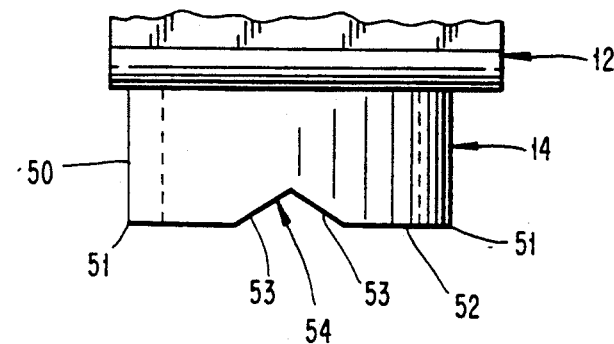
FIG. 13 is a left side view of the probe housing.

Referring to FIGS. 12 and 13, which show the details of the probe housing 14 of the coating thickness measurement gauge according to the present invention, the probe housing 14 is configured to easily measure coatings on convex surfaces such as the outer surfaces of pipes and the like while at the same time being configured to facilitate the measurement of coating thicknesses on concave surfaces such as the inside surfaces of pipes, etc.

As seen in FIG. 13, the probe housing 14 is defined by a somewhat elongated extension portion 50 that is formed in one piece with the housing 12. The extension portion 50 is preferably centered in the width-wise direction of the housing 12. A V-shaped notch 54 is formed in the bottom surface 52 of the extension portion 50 on opposite sides of the probe housing 14. Each of the V-shaped notches 54 is defined by inclined surfaces, 53, 53 and each of the notches 54 opens to the bottom surface 52 of the extension portion 50. The V-shaped notch 54 serves to guide the probe as it is being used to measure the thickness of a coating on a convex surface. In order to measure the thickness of a coating on the outer surface of, for example, a pipe, the gauge is positioned such that the inclined surfaces 53, 53 straddle the outer periphery of the pipe. The gauge can be moved along the length of the pipe and the V-shaped notch 54 ensures that the position of the probe tip 24 remains constant with respect to the outer surface of the pipe from one point to the next along the length of the pipe. Also, the V-shaped notch 54 serves to stabilize the position of the gauge, thereby contributing to the achievement of accurate measurements.

Turning to FIG. 12, a substantially circular through hole 25 extends through the extension portion 50 and communicates with the interior of the housing 12. Although not shown in FIGS. 12 and 13, the probe 26 extends through the through hole 25.

The outer peripheral surface of the extension portion 50 is defined by two oppositely positioned flat surfaces 15,15 and two oppositely positioned, preferably non-circular, arcuate surfaces 56,56. The arcuate outer peripheral surfaces 56,56 are preferably shaped as a portion of an ellipse or oval.

The flat surfaces 15, 15 and the arcuate surfaces 56, 56 are designed to facilitate measurement of the thickness of coatings on concave surfaces. More particularly, when measuring the coating thickness on a concave surface such as the interior surface of a hollow pipe, the coating thickness measurement gauge 10 is positioned such that the bottom surface 52 of the extension portion 50 faces the concave surface on which is located the coating whose thickness is to be measured and such that the flat surfaces 15, 15 are substantially parallel to the longitudinal axis of, for example, the pipe. As the gauge 10 is moved towards the concave surface, the probe assembly 24 will contact the concave surface and will move substantially vertically upwardly in the probe housing 14 until the bottom surface 52 of the extension portion 50 comes into contact with the concave surface on which is located the coating whose thickness is being measured. As a result, the straight edges 51 defined by the intersection between the flat surface 15, 15 and the bottom surface 52 of the probe housing 14 contact and rest against the concave surface having the coating located thereon. Thus, the contact between the probe housing 14 and the concave surface is defined by two spaces apart lines rather than two points as would be the case if the outer peripheral surface of the extension portion 50 were circular or otherwise accurately shaped. Since the probe housing 14 contacts the concave surface at more than two spaced apart points (i.e., along two spaced apart lines) the stability of the gauge is increased and the gauge is substantially prevented from rocking on the concave surface. As a result, the position of the probe tip 24 remains constant with respect to the concave surface and the accuracy of the measurements is increased.

The shape of the arcuate outer peripheral surfaces 56 is also advantageous because it permits the contact area of the probe housing 14 to be maximized for better stability of the gauge on the coated surface, regardless of the shape of the surface.

It is to be understood that the advantageous configuration of the probe housing as depicted in FIGS. 12 and 13 is usable in conjunction with each of the probe assembly mountings shown in FIGS. 5 and 7-9.

Having described the construction of the coating thickness gauge in detail, an exemplary operation of the gauge together with its various operational modes will be described. The various operational states of the gauge are set forth in detail below. Having described the various operational modes, a description of the general operation of the gauge from the standpoint of the user will then be set forth. It being understood that the manner of operation and the various operational modes as described are by way of example only. Moreover, programming of the microprocessor 8 to realize the described operations would involve only the application of ordinary skill by the routineer in the art of programming.

POWER OFF STATE

ENTRY: from POWER DOWN
Operation: In the power off state the LCD is blank.
 During power off the gauge retains in nonvolatile memory:
 the selected material class
 the last zero calibration
 the mode of operation (eg. Tolerance Mode)
Exit: probe depression goto POWER UP

POWER UP STATE

Entry: probe depression from POWER OFF.
Operation: perform initialization and self test. Display (on LCD) the following error codes if self test fails:
 "ERR 1XX", EPROM checksum error, XX is the eight bit checksum
 "ERR 2 ", VOLATILE SRAM error
 "ERR 3 XX", NONVOLATILE SRAM checksum error, XX is the eight bit checksum
 "ERR 4 ", OSCILLATOR failure beep once (low pitch)
Exit: probe lift goto START MEASUREMENT, time-out goto POWER DOWN.

START MEASUREMENT STATE

Entry: probe lift from POWER UP, IDLE TMODE, IDLE, IDLE MATERIAL, IDLE ZERO.
Operation: prepare for a measurement.
Exit: low battery goto LOW BATTERY, not low battery goto MATERIAL CLASS

LOW BATTERY STATE

ENTRY: low battery from START MEASUREMENT.
Operation: display on LCD "LOW BATT".
Exit: goto MEASUREMENT

MATERIAL CLASS STATE

Entry: not low battery from START MEASUREMENT.
Operation: display on LCD the current material class. (e.g., "STEEL")
Exit: goto MEASUREMENT

MEASUREMENT STATE

Entry: LOW BATTERY, MATERIAL CLASS
Operation: perform a measurement of the probe oscillator.
Exit: probe release before measurement complete goto PROBE RELEASE, invalid substrate material and not zero mode goto INVALID, valid measurement and not tolerance mode and not zero mode goto VALID, valid measurement and tolerance mode goto VALID TOLERANCE, valid measurement and zero mode goto VALID ZERO, invalid substrate material and zero mode goto ZERO.

PROBE RELEASE STATE

Entry: early probe release from MEASUREMENT.
Operation: display currently selected material class on the LCD.
Exit: goto IDLE TMODE.

INVALID STATE

Entry: invalid substrate material from MEASUREMENT.
Operation: display "—" on the LCD.
Exit: goto IDLE TMODE.

VALID STATE

Entry: valid measurement and not tolerance mode from MEASUREMENT.
Operation: display measurement result on LCD and beep twice.
Exit: goto IDLE.

VALID TOLERANCE STATE

Entry: valid measurement and tolerance mode.
Operation: compare valid measurement to stored tolerance and
if result is within $\pm -10\%$ beep twice and display "T"
if result is above 10% beep once (high pitch) and display an up arrow symbol
if result is below 10% beep once (low pitch) and display a down arrow symbol.
Exit: goto IDLE TGMODE.

IDLE TMODE STATE

Entry: from PROBE RELEASE, INVALID, VALID TOLERANCE
Operation: enter low power consumption mode. Wake up every 10 ms and check the probe switch, "+" button and "—" button.
Exit: "+" button action goto IDLE MATERIAL, probe depression goto START MEASUREMENT, simultaneous "+" and "—+" action goto TMODE OFF, time-out goto POWER DOWN.

IDLE MATERIAL STATE

Entry: "+" button action from IDLE TOLERANCE.
Operation: display next material class on LCD.
Exit: "+" button action goto IDLE MATERIAL, probe depression goto START MEASUREMENT, "—" button action goto ZERO, time-out goto POWER DOWN.

ZERO STATE

Entry: "—" button action from IDLE MATERIAL
Operation: set zero mode. Alternatively display "ZERO ON" and current material class on LCD.
Exit: probe action goto START MEASUREMENT, time-out goto POWER DOWN, "—" or "+" button action goto IDLE MATERIAL

VALID ZERO

Entry: valid measurement and zero mode from MEASUREMENT.
Operation: clear zero mode. Display "0.0 " on LCD.
Exit: goto IDLE TMODE

TMODE OFF

Entry: simultaneous "+" and "—" button action from IDLE TMODE.
Operation: clear the tolerance mode.
Exit: goto IDLE.

IDLE STATE

Entry: TMODE OFF, VALID.
Operation: enter low power consumption mode. Wake up every 10 ms and check the probe switch, "+" button and "—" button.
Exit: "+" button action goto IDLE MATERIAL, probe depression goto START MEASUREMENT, simultaneous "+" and "—38 button action goto TMODE ON, time-out goto POWER OFF.

TMODE ON STATE

Entry: simultaneous "+" and "—" button action from IDLE.
Operation: set the tolerance mode.
Exit: goto IDLE TMODE.

POWER DOWN STATE

Entry: one (1) minute inactivity.
Operation: do housekeeping before power off.
Exit: goto POWER OFF.

From the standpoint of the user, the general operation of the gauge can be as follows. The thickness gauge remains in a power-down state until the probe is depressed, at which time an initialization/test routine is performed. At the same time, the previous material class, zero calibration value and mode of operation, retained in a nonvolatile memory during the power-off state, become effective. If the battery is determined to be low during the test routine, an indication "LO BAT" is displayed, alerting the operator. Otherwise, the previous material class, for example steel, is displayed for verification by the operator. By pressing a button 17 on the housing 12 labelled "+", the next one of a list of possible materials (or indications indicative of possible materials) is selected and displayed and a NEWMAT flag is set. Pressing the "+" button 17 results in an audible beep, as does pressing the "−" button 13. Once the appropriate material class corresponding to the substrate material has been selected, a normal mode of operation is entered by once again depressing the probe. Alternatively, a tolerance mode of operation, to be described, may also be selected.

Once the probe has been depressed, the gauge pauses to give the operator time to adjust the probe position, at the same time displaying the selected material class. If a new material has been selected, the operator prompt "ZERO FIRST" is displayed, indicating that a measurement cannot be performed until the gauge has been newly-zeroed. The particulars of zeroing the probe will also be described hereinafter.

If a new material class has not been selected, the gauge then checks whether or not the tolerance mode of operation has been selected. If not, a normal measurement is taken and displayed, completion of the measurement being audibly signaled to the operator by two successive beeps. In addition, a MEASURED flag is set indicating that a thickness measurement has been successfully completed. The gauge ensures that the substrate underlying the coating is metallic (has a perceptible effect on probe oscillator frequency) and that the measurement is therefore valid. If a non-metallic substrate is indicated, dashes are displayed instead of a numerical value.

In the tolerance mode, the gauge determines whether a subsequent measurement is within a specified tolerance, for example $\pm 10\%$, of a previous measurement. If the subsequent measurement is within tolerance, an audible indication of two beeps is given to the operator. If the subsequent measurement is outside the specified tolerance, an up arrow or a down arrow is displayed, indicating that the measured coating is either too thick or too thin, and a single beep is given.

Once a new material class has been selected, the gauge is zeroed by pressing the button 13 labelled "−". Assuming that the gauge is in a normal mode of operation and that a new material class has been selected, the indication "ZERO ON" is alternately displayed with the selected material class. Zeroing then proceeds by placing the probe on the bare substrate material. If the substrate material is detected to be metal, a zero reading is taken and the value "0.0" is displayed. Otherwise, "ZERO ON" continues to be displayed alternately with the selected material class. If the thickness gauge is not in the normal operating mode but is instead in the tolerance mode of operation, pressing the "−" button 13 causes the reference measurement, to which subsequent measurements are compared, to be displayed.

Simultaneously pressing the "+" and "−" buttons 17,13 causes either the tolerance mode to be entered if the gauge is presently in the normal operating mode and a measurement has been taken or causes the tolerance mode to be exited if the gauge is presently in the tolerance mode.

If the probe is not depressed and no other activity is detected for a certain period of time which is determined by the manufacturer, the instrument shuts itself off and the selected material class, the last zero calibration value and the mode of operation are retained in nonvolatile memory during a power-down routine.

The coating thickness measurement gauge of the present invention is thus seen to be not only simply and compactly constructed, but also exceedingly simple to use. Of the three switches that control all of the gauge's operations, the operator need only concern himself with two switches, the third being incorporated into the probe assembly itself. Through operation of one of the two switches, the operator can alternately and selectively display the various substrate materials on the LCD. Upon reaching the substrate material that corresponds to the substrate upon which is located or will be located the coating whose thickness is to be measured, the probe is depressed to indicate a selection of that material. Upon actuation of the selection switch, the aforementioned coefficients $A_{0-4}$ or $B_{0-4}$ which are associated with the selected substrate material are also retrieved from the ROM for use in the appropriate equation.

By having the probe as part of an LC oscillator 4, numerous additional advantages are obtained. The probe's impedance is evaluated simply by detecting the frequency of oscillation and with an accuracy greater than that obtained by measuring other parameters related to the probe's impedance. There is no need to digitize the probe output since the frequency is counted digitally. As a result, it is very simple to combine the oscillator 4 with a microprocessor 8 and to display the thickness measurement on a digital display 10. Since the microprocessor 8 can be programmed to calculate coating thicknesses for either ferromagnetic or non-ferromagnetic substrates, the same probe may be used for both. Additionally, the probe design of the present invention avoids the problems of wire breakage and bearing surface wear, and battery power can be conserved without relying on the operator to manually switch off the gauge. Further, the design of the probe housing facilitates the accurate measurement of coating thicknesses on concave surfaces as well as convex surfaces. The suspension arrangement of the probe is simple and accurate, allowing precisely reproducible positioning to be achieved at each measurement. Moreover, the ability of the gauge to be calibrated through a one point calibration procedure simplifies the construction and operation of the gauge and also reduces the cost associated with fabricating the gauge.

Situations may sometimes arise when the use of a coating thickness measurement gauge that operates on the Eddy Current method may not be best suited for measuring the thickness of a particular coating. For example, coatings that are able to absorb electromagnetic waves may adversely affect the accuracy of measurements obtained through use of a gauge which operates on the Eddy Current method because the electromagnetic wave absorption capabilities of the coating may influence the magnetic field created by the AC-excited inductive coil. An example of a coating which possesses the aforementioned capability of absorbing electromagnetic waves is a coating which contains magnetic particles. Another embodiment of the coating thickness measurement gauge of the present invention is able to accurately measure the thickness of a coating that absorbs electromagnetic waves.

Figure 14:
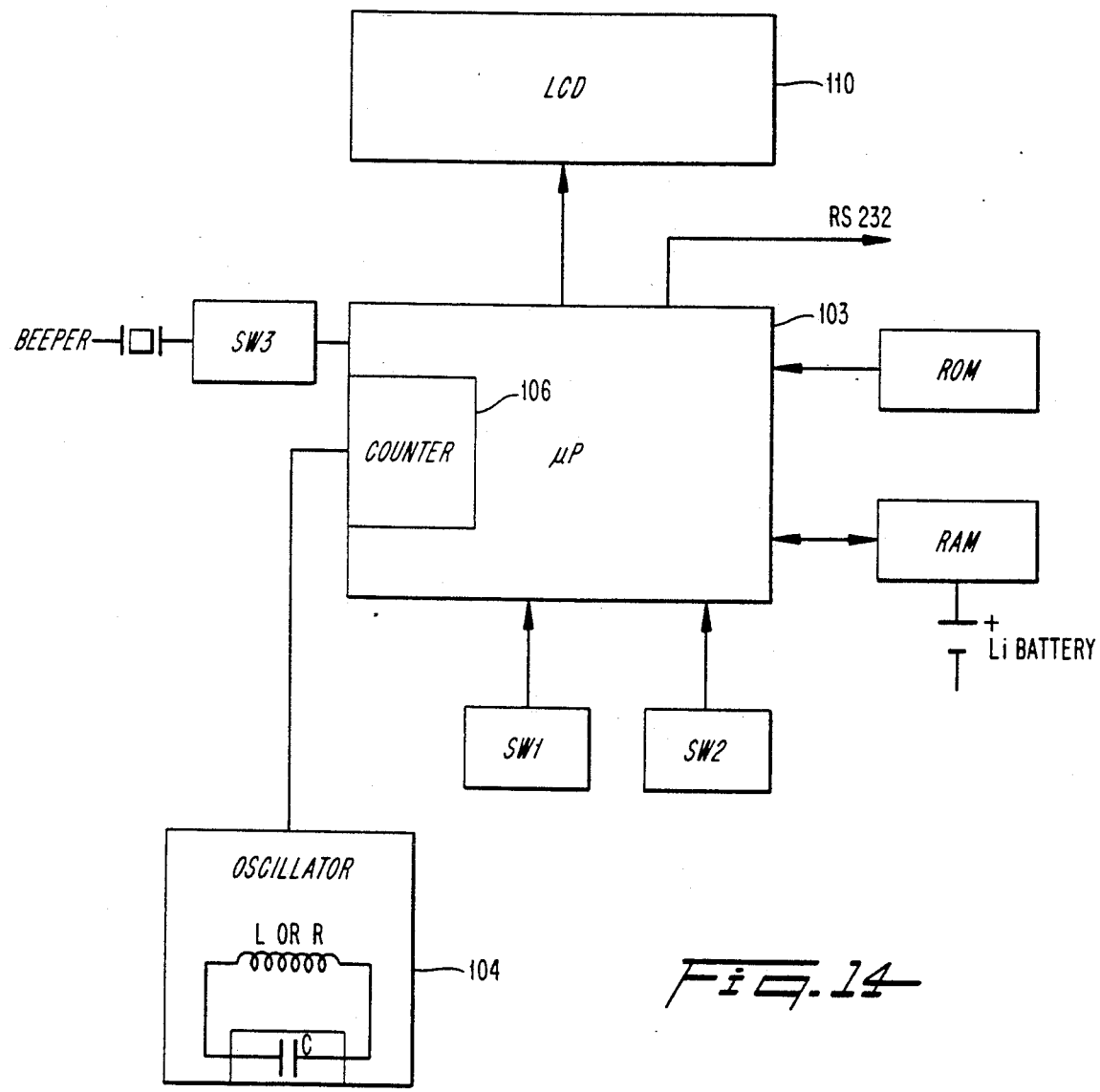
FIG. 14 is a block diagram of the coating thickness measurement gauge according to another embodiment of the present invention.

As seen in FIG. 14, the coating thickness measurement gauge according to another embodiment of the present invention is similar in some respects to the embodiment described above. The coating thickness measurement gauge according to this different embodiment is controlled by a microprocessor unit 108 with an associated display 110. The gauge housing which surrounds the parts of the gauge may be the same as that illustrated in FIGS. 1 and 2. Likewise, the gauge can include a protective cover similar to that shown in FIGS. 1 and 2 for protecting the probe assembly located in the probe housing.

The probe assembly of the coating thickness measurement gauge according to the embodiment illustrated in FIG. 14 is the capacitor of an LC or RC oscillator 104. By incorporating the capacitor into an RC or LC oscillator, the capacitance of the capacitor can be readily determined by measuring the frequency of oscillation of the oscillator. Since the capacitance of the capacitor will vary depending upon its proximity to the substrate, the thickness of the coating (i.e. the distance between the capacitor and the substrate) can be measured by determining the frequency of the oscillator when the probe is placed against the coating and comparing that frequency to a reference frequency representing the frequency of the oscillator when the probe is placed against the bare substrate.

The frequency of the oscillator 104 can be determined by the counter 106 which may be a part of the microprocessor unit 108. By way of example, a timing loop may be programmed into the microprocessor unit 108 so that the microprocessor 108 resets the counter 6 at the beginning of the timing loop and measures the period of time elapsed until a predetermined number of pulses has occurred as indicated by an overflow signal. The pulses may be prescaled or divided down such that a counter of reasonable capacity can be used. However, the number of measured oscillations should be large enough to achieve the desired accuracy.

Figure 15:
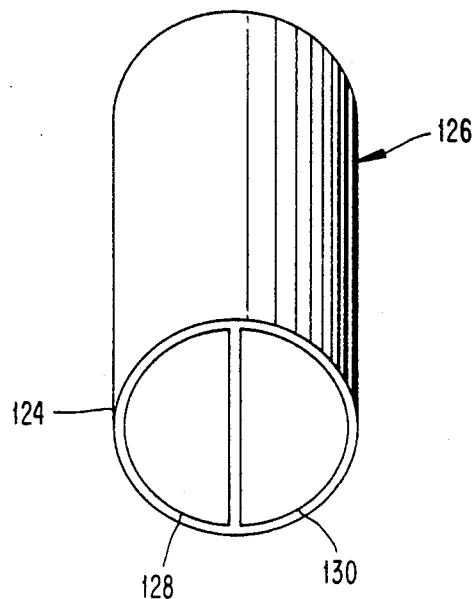
FIG. 15 is a bottom perspective view of one arrangement of the probe assembly according to the embodiment of the present invention illustrated in the block diagram of FIG. 14.

Turning to FIG. 15, the probe assembly which is located within the probe housing (not shown) is illustrated. According to one arrangement, the probe assembly 126 includes two capacitor plates 128, 130 positioned within a substantially cylindrical enclosure 124. The two capacitors plates 128, 130 are semi-circular in shape and are spaced apart from one another by a predetermined distance.

Figure 16:
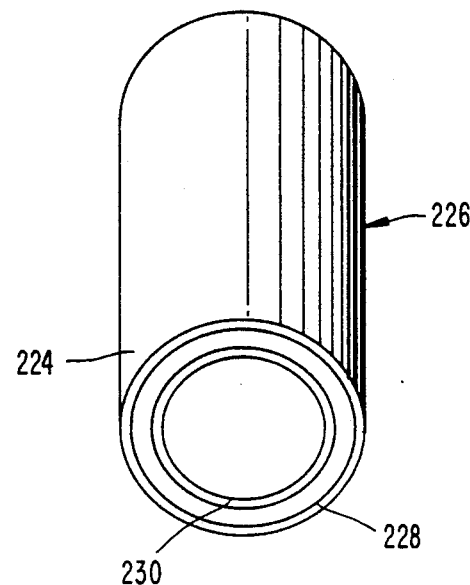
FIG. 16 is a bottom perspective view of another arrangement of the probe assembly according to the embodiment of the present invention illustrated in the block diagram of FIG. 14.

An alternative arrangement for the probe assembly is shown in FIG. 16. In the alternative arrangement, the probe assembly 226 includes an outer ring-shaped capacitor plate 228 and an inner ring-shaped capacitor plate 230. The two capacitor plates 228, 230 are spaced apart from one another by a predetermined distance and may be positioned within a substantially cylindrical body 224.

Figure 17:
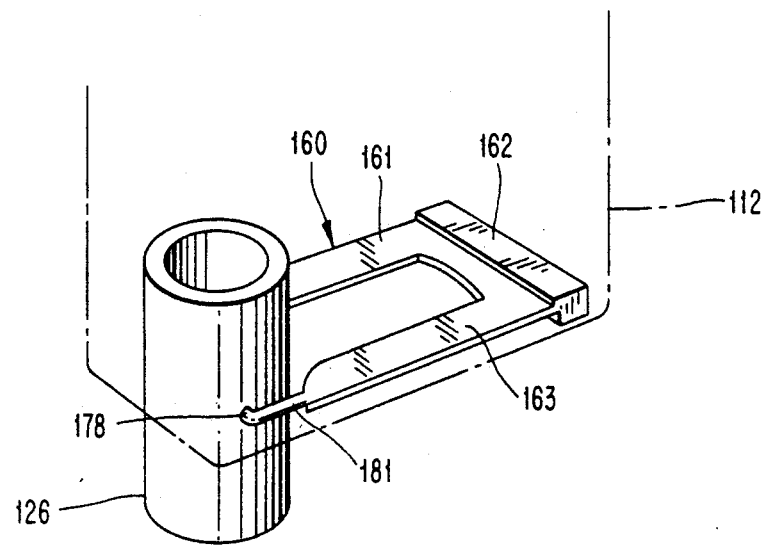
FIG. 17 is a top perspective view showing the probe assemblies of FIGS. 16 and 17 mounted in the probe housing.

FIG. 17 illustrates the manner in which the probe assembly 126 is mounted within the probe housing 112. For purposes of simplicity, the following description refers to the probe assembly 126 shown in FIG. 15, but it is to be understood that the alternative probe assembly shown in FIG. 16 may be mounted in the same manner illustrated in FIG. 17. The structure for mounting the probe assembly 126 within the probe housing 112 includes a suspension lever 160. The suspension lever 160 includes a pair of arms 161, 163 that are preferably integrally formed in one piece with a mounting plate 162. The mounting plate 162 can be fixedly secured to the inside surface of a wall of the probe housing 112 in any suitable manner. The end of each arm 161, 163 is connected and preferably integrally formed in one piece with a pintle 181. FIG. 17 illustrates the pintle 181 associated with the arm 163, but it is to be understood that the other arm 161 has a similar pintle connected to and integrally formed therewith. Two blind holes or gudgeons 178, only one of which is shown in FIG. 17, are formed in the probe assembly 126. The two blind holes or gudgeons 178 are positioned substantially diametrically opposite to one another. The pintles 181 are loosely fitted into the gudgeons 178 so that the probe assembly 126 can rotate about an axis passing through the centers of the oppositely positioned pintles 181.

One of the advantages associated with mounting the probe assembly 126 on a single pair of arms 161, 163, is that when the gauge is being used to measure the thickness of a coating on a flat surface, the probe assembly will be able to pivot or rotate about the pintles 181, thereby helping to ensure that the flat surface of the capacitor plates remains substantially parallel to the flat coating surface.

Although not shown, it is to be understood that the probe housing 112 can be configured in the same manner described above and illustrated in FIGS. 12 and 13. Also, it is to be understood that the suspension lever 160 is preferably mounted within the probe housing 112 in an inclined manner so that the longitudinal axis of each arm 161, 163 forms an angle of approximately 4° with the dead center position (i.e., a horizontal plane perpendicular to the longitudinal plane of the gauge) when no upward force is applied to the probe assembly 126. The advantages associated with such an arrangement are similar to those noted above with respect to the embodiments illustrated in FIGS. 5, 7 and 8.

It is also to be understood that a switch mechanism similar to the switch mechanisms described above and shown in FIGS. 5 and 7, may be used in conjunction with the embodiment illustrated in FIG. 17.

It may be desirable in some instances to provide a thin coating over the capacitor plates in order to protect the capacitor plates from damage due to contact and movement across substrates and coatings. However, if desired, such a protective film may be omitted.

During use, the gauge is placed against a coating whose thickness is to be measured. The total distance between the capacitor and the substrate on which is located the coating is equal to the coating thickness. Of course, if a thin protective film is placed over the capacitor, the thickness of the film will have to be taken into account when determining the thickness of the coating. The voltage across the capacitors 128, 130 or 228, 230 varies in dependance upon the proximity of the capacitors to the substrate as well as the dielectric constant of the coating material. Since the capacitor forms a part of an LC oscillator, variations in the capacitance of the capacitor will cause a variation in the oscillation frequency of the oscillator. Thus, there exists a relationship between the change in frequency of the oscillator and the thickness of the coating. That relationship may be approximated by the same fourth-order polynominal noted above, namely $$Y = A_0 + A_1 F + A_2 F^2 + A_3 F^3 + A_4 F^4$$

where the coefficients $A_{0-4}$ are determined by the dielectric constant of the coating material and the term F represents the change in frequency.

The coefficients $A_{0-4}$ may be empirically determined for each coating material or for groups of coating materials that possess similar dielectric constants by measuring the frequency change of the particular coating material or groups of coating materials having a known thickness. A complete set of coefficients $A_{0-4}$ for each coating material or group of coating materials can then be stored in a ROM portion of the microprocessor unit 108 (see FIG. 14) during production of the thickness gauge. Upon selection of one of the coating materials or groups of coating materials stored in the memory, the coefficients $A_{0-4}$ associated with the selected coating material or group of coating materials can be recalled from the ROM and employed along with the measured frequency change in the equation noted above in order to determine the coating thickness.

Changes in the oscillation frequency upon which the thickness calculations are based occur in the analog domain whereas the calculations themselves are performed in the digital domain. Conversion from the former to the latter is carried out through use of the counter 106 in the same manner noted above with respect to the inductor coil embodiment.

When the substrate upon which the coating is situated is a non-conductive material, it will be necessary prior to measuring the thickness of the coating to place the probe assembly against a bare portion of the substrate on which is located the coating in order to zero the gauge and thereby determine a reference frequency. Alternatively, the gauge can be zeroed by placing the probe assembly against the bare surface of a material that is the same as the substrate.

On the other hand, if the substrate upon which is located the coating is a conductive material, it will not be necessary to zero the gauge in order to obtain a reference frequency because the conductive material will tend to short the electric field across the conductive plates, regardless of the specific type of material which constitutes the conductive substrate. In other words, the reference frequency of most conductive materials will be substantially the same.

As an alternative to the aforementioned empirical determination of the constants $A_{0-4}$, a two-point calibration procedure may be employed similar to the two-point calibration procedure pointed out above with respect to other types of coating thickness measurement gauges.

The operation of the gauge illustrated in FIGS. 14-17 which employs a capacitor for measuring the coating thickness and the operational modes associated therewith may be similar to those noted above with respect to the embodiment which utilizes the inductor coil for measuring coating thicknesses. It being understood that the manner of operation and the operational modes may be varied.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. A gauge for measuring the thickness of a coating on a substrate comprising:
   a probe assembly for contacting a substrate having a coating located thereon;
   transducer means coupled to said probe assembly for providing a usable output in response to a thickness of the coating; and
   a probe housing encircling said probe assembly and having a bottom surface and a peripheral outer surface, said peripheral outer surface having at least one flat surface portion that intersects said bottom surface at a straight edge so that the probe housing contacts a concave surface along at least one straight line when the probe housing is brought into contact with the concave surface with the bottom surface of the probe housing facing the concave surface, whereby the position of the probe assembly and the probe housing is stabilized.

2. The gauge according to claim 1 wherein the peripheral outer surface of the probe housing includes two flat surface portions, each flat surface portion intersection the bottom surface at a straight edge, said two flat surface portions being oppositely positioned and spaced apart from one another by arcuate surface portions.

3. The gauge according to claim 1, wherein said probe housing has two oppositely positioned V-shaped grooves formed therein that open to the bottom surface of the probe housing.

4. A gauge for measuring the thickness of a coating on a substrate comprising:
   a gauge housing;
   a probe assembly;
   transducer means coupled to said probe assembly for providing a usable output in response to a thickness of the coating;
   at least one lever mounted within the gauge housing and having a longitudinal axis that is transversely arranged with respect to the longitudinal axis of the probe assembly, said probe assembly being mounted on the at least one lever for movement relative to the gauge housing;
   means for producing, during movement of said probe assembly, a horizontal component of movement in said at least one lever; and
   means for producing, during movement of said probe assembly, a horizontal component of movement that cancels out the horizontal component of movement in the at least one lever.

5. The gauge according to claim 4, wherein said means for producing a horizontal component of movement includes said at least one lever being fixedly mounted to an inner wall of the gauge housing.

6. The gauge according to claim 5, including hinge means for hingedly connecting said at least one lever to said probe assembly.

7. The gauge according to claim 5, wherein said probe assembly has a longitudinal axis that is substantially parallel to a longitudinal axis of the gauge housing, the longitudinal axis of said probe assembly forming an angle greater than ninety degrees with the longitudinal axis of the at least one lever.

8. The gauge according to claim 5, wherein said transducer means includes a wire wound around a lower end of the probe assembly, an extension of said wire being secured to one or said suspension levers.

9. The gauge according to claim 5, wherein said means for producing a horizontal component of movement that cancels out the horizontal component of movement in the at lease one lever includes said at least one lever being inclined downwardly toward a bottom of the gauge housing at a predetermined angle with respect to a horizontal plane that is perpendicular to a longitudinal plane of the gauge housing.

10. The gauge according to claim 9, wherein said predetermined angle is approximately four degrees.

11. The gauge according to claim 4, wherein said probe assembly is mounted on two levers, each of said levers including two spaced apart parallel arms, each arm being fixedly secured to an inner wall of the gauge housing at a first end and having a pintle secured to an opposite end thereof, each pintle being positioned in a gudgeon formed in the probe assembly and being freely movable in the respective gudgeon.

12. The gauge according to claim 11, wherein said gudgeons in the probe assembly are arranged in two diametrically opposed pairs, the pairs of gudgeons being spaced apart from one another in the longitudinal direction of the probe assembly.

13. The gauge according to claim 4, wherein said means for producing a horizontal component of movement that cancels out the horizontal component of movement in the at least one lever includes said at least one lever being inclined downwardly toward a bottom of the gauge housing at a predetermined angle with respect to a horizontal plane that is perpendicular to a longitudinal plane of the gauge housing.

14. The gauge according to claim 13, wherein said predetermined angle is approximately four degrees.

* * * * *

UNITED STATES PATENT AND TRADEMARK OFFICE
CERTIFICATE OF CORRECTION

PATENT NO. : 5,241,280

DATED : August 31, 1993

INVENTOR(S) : Frank J. KOCH

It is certified that error appears in the above-identified patent and that said Letters Patent is hereby corrected as shown below:

On the title page of the above-identified patent, please change:

"[75]  Inventors:   Rashid K. Aidun, Potsdam; Frank J.
                    Koch, Ogdensburg, both of N.Y."

to
-- [75]  Inventor:  Frank J. Koch, Ogdensburg, New York --.

Signed and Sealed this

Twenty-sixth Day of April, 1994

*Attest:*

BRUCE LEHMAN

*Attesting Officer*    *Commissioner of Patents and Trademarks*